(12) United States Patent
Yokoyama et al.

(10) Patent No.: US 11,772,631 B2
(45) Date of Patent: Oct. 3, 2023

(54) HOME POSITION ESTIMATION SYSTEM AND HOME POSITION ESTIMATION METHOD

(71) Applicant: TOYOTA JIDOSHA KABUSHIKI KAISHA, Aichi-ken (JP)

(72) Inventors: Daiki Yokoyama, Gotemba (JP); Hiroya Chiba, Susono (JP); Yoshiyuki Kageura, Shizuoka-ken (JP); Masanori Shimada, Susono (JP); Yoshihiro Sakayanagi, Mishima (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 29 days.

(21) Appl. No.: 17/412,267

(22) Filed: Aug. 26, 2021

(65) Prior Publication Data
US 2022/0089144 A1    Mar. 24, 2022

(30) Foreign Application Priority Data

Sep. 24, 2020 (JP) ................................ 2020-159696

(51) Int. Cl.
*F02N 11/08* (2006.01)
*B60W 20/16* (2016.01)
(Continued)

(52) U.S. Cl.
CPC ............... *B60W 20/16* (2016.01); *B60K 6/22* (2013.01); *B60W 2420/42* (2013.01);
(Continued)

(58) Field of Classification Search
CPC ...... B60W 10/08; B60W 10/06; B60W 20/12; B60W 20/16; B60W 2555/60;
(Continued)

(56) References Cited

U.S. PATENT DOCUMENTS 9,064,418 B2 * 6/2015 Takemura ................ G08G 1/16
10,685,447 B2 * 6/2020 Sergeev .................... G06T 7/97
(Continued)

FOREIGN PATENT DOCUMENTS

EP   4008893 A1 * 6/2022 ............ B60W 10/06
FR   3070656 A1 * 3/2019 ............ B60W 20/12
(Continued)

OTHER PUBLICATIONS

Ho, et al."Efficient 3D Road Map Data Exchange for Intelligent Vehicles in Vehicular Fog Networks," in IEEE Transactions on Vehicular Technology, vol. 69, No. 3, pp. 3151-3165, Mar. 2020, doi: 10.1109/TVT.2019.2963346. (Year: 2020).*

(Continued)

*Primary Examiner* — Cuong H Nguyen
(74) *Attorney, Agent, or Firm* — HAUPTMAN HAM, LLP

(57) ABSTRACT

The home position estimation system includes a GNSS receiver, an object detection device for detecting an object in surroundings of the hybrid vehicle, an identifying part configured to identify the object detected by the object detection device, and a position estimating part configured to estimate a position of the hybrid vehicle based on an output of the GNSS receiver. If a predetermined condition is satisfied and the object identified by the identifying part is an object indicating a boundary of a low emission zone which requires that the internal combustion engine be stopped, the position estimating part is configured to judge whether the hybrid vehicle is located within the low emission zone, regardless of the output of the GNSS receiver, based on a result of identification by the identifying part.

9 Claims, 11 Drawing Sheets

(51) Int. Cl.
  *B60K 6/22*   (2007.10)
  *G01S 19/42*  (2010.01)

(52) U.S. Cl.
  CPC ..... *B60W 2555/60* (2020.02); *B60W 2556/45* (2020.02); *B60Y 2200/92* (2013.01); *B60Y 2300/192* (2013.01); *F02N 11/08* (2013.01); *F02N 2200/123* (2013.01); *G01S 19/42* (2013.01)

(58) Field of Classification Search
  CPC ......... B60W 2554/20; B60W 2556/45; B60W 2420/42; B60W 2556/50; B60K 6/20; B60K 6/22; B60Y 2300/192; B60Y 2200/92; G01S 19/42; Y02T 10/62
  USPC .......................................................... 701/22
  See application file for complete search history.

(56) References Cited

U.S. PATENT DOCUMENTS

| | | | |
|---|---|---|---|
| 2003/0078707 A1 | 4/2003 | Shioda et al. | |
| 2014/0104408 A1* | 4/2014 | Nanba | G06V 10/95 348/119 |
| 2015/0032310 A1* | 1/2015 | Zettel | B60W 20/16 180/65.265 |
| 2015/0310621 A1* | 10/2015 | Matono | H04N 13/239 348/47 |
| 2017/0270370 A1* | 9/2017 | Utagawa | B60R 1/00 |
| 2018/0118100 A1* | 5/2018 | Kjaer-Lohse | B62D 15/027 |
| 2018/0211394 A1* | 7/2018 | Sergeev | G06T 7/20 |
| 2020/0090004 A1 | 3/2020 | Takeyasu et al. | |

FOREIGN PATENT DOCUMENTS

| | | |
|---|---|---|
| FR | 3070656 A1 | 3/2019 |
| JP | H775210 A | 3/1995 |
| JP | 2003-111208 A | 4/2003 |
| JP | 2014-172424 A | 9/2014 |
| JP | 2020-046706 A | 3/2020 |

OTHER PUBLICATIONS

Y. Wang, V. Menkovski, I. W.-H. Ho, and M. Pechenizkiy, "VANET meets deep learning: The effect of packet loss on the object detection performance," in Proc. IEEE Veh. Technol. Conf., 2019, pp. 1-5. (Year: 2019).*

A translated version for FR-3070656-A1 by Hugues (Year: 2019).*

Hansen, Lillian, et al. an abstract of "GeoSence. Current state of the art and use case description on geofencing for traffic management." (2021). (Year: 2021).*

Saunders, Janet, et al. "Integrating Transport Programmes for Sustainable Reduction in Urban Road Congestion—Best Practise Examples from Local Authorities Working with SUITS." Capacity Building in Local Authorities for Sustainable Transport Planning. Singapore: Springer Nature Singapore, 2023. 137-179 (Year: 2023).*

Arnesen, Petter, et al. "TEAPOT. Summarizing the main findings of work package 1 and work package 2." (2022). (Year: 2022).*

* cited by examiner

HOME POSITION ESTIMATION SYSTEM AND HOME POSITION ESTIMATION METHOD

RELATED APPLICATIONS

The present application claims priority of Japanese Patent Application No. 2020-159696 filed Sep. 24, 2020, the disclosure of which is hereby incorporated by reference herein in its entirety.

FIELD

The present disclosure relates to a home position estimation system and a home position estimation method.

BACKGROUND

In recent years, in order to curb air pollution, low emission zones (LEZ) which require a vehicle to stop its internal combustion engine when driving through them have been established in locations such as urban areas with large amounts of traffic. When a hybrid vehicle provided with an internal combustion engine and an electric motor is driving through such a low emission zone, it is necessary to stop the internal combustion engine and use only the electric motor to output power for driving use.

In this regard, PTL 1 discloses using a GNSS receiver to estimate the position of a hybrid vehicle and making the internal combustion engine stop if the position of the hybrid vehicle is within a low emission zone ("reinforced air pollution preventing region" in PTL 1).

CITATIONS LIST

Patent Literature

[PTL 1] Japanese Unexamined Patent Publication No. 07-075210

SUMMARY

Technical Problem

However, sometimes the precision of estimation of the position by a GNSS receiver drops depending on the driving environment etc. In such a case, erroneous position recognition is liable to cause the internal combustion engine to be driven despite the position of the hybrid vehicle being in a low emission zone.

Therefore, in consideration of the above problem, an object of the present disclosure is to suppress erroneous recognition of the position of a hybrid vehicle in the vicinity of a low emission zone when the precision of detection by a GNSS receiver drops.

Solution to Problem

The summary of the present disclosure is as follows.

(1) A home position estimation system for estimating a position of a hybrid vehicle comprising an internal combustion engine, an electric motor, and a battery, comprising: a GNSS receiver; an object detection device for detecting an object in surroundings of the hybrid vehicle; an identifying part configured to identify the object detected by the object detection device; and a position estimating part configured to estimate a position of the hybrid vehicle based on an output of the GNSS receiver, wherein if a predetermined condition is satisfied and the object identified by the identifying part is an object indicating a boundary of a low emission zone which requires that the internal combustion engine be stopped, the position estimating part is configured to judge whether the hybrid vehicle is located within the low emission zone, regardless of the output of the GNSS receiver, based on a result of identification by the identifying part.

(2) The home position estimation system described in above (1), wherein the object detection device is an imaging device capturing an outside the hybrid vehicle and generating an image, and the object indicating the boundary of the low emission zone is a sign.

(3) The home position estimation system described in above (2), wherein the identifying part is configured to use a trained neural network model outputting a result of identification and a confidence of the result of identification to identify the object detected by the object detection device, and the predetermined condition includes the confidence being equal to or greater than a predetermined value.

(4) The home position estimation system described in above (2), wherein the predetermined condition includes a current driving environment of the hybrid vehicle not being a predetermined driving environment in which a precision of detection by the imaging device worsens.

(5) The home position estimation system described in above (1), wherein the object detection device is a road-to-vehicle communication device, and the object indicating the boundary of a low emission zone is a road-side device.

(6) The home position estimation system described in above any one of (1) to (5), wherein the predetermined condition includes the hybrid vehicle being located in a vicinity of the low emission zone.

(7) The home position estimation system described in above any one of (1) to (6), further comprising a reliability calculating part configured to calculate a reliability of a result of output of the GNSS receiver, wherein the predetermined condition includes the reliability being equal to or less than a reference value.

(8) The home position estimation system described in above any one of (1) to (7), wherein the position estimating part is configured to receive position information of the hybrid vehicle from a server outside the hybrid vehicle, and the predetermined condition includes communication between the hybrid vehicle and the server being interrupted.

(9) A home position estimation method for estimating a position of a hybrid vehicle comprising an internal combustion engine, an electric motor, and a battery, including: detecting an object in surroundings of the hybrid vehicle by an object detection device; identifying the object detected by the object detection device; estimating a position of the hybrid vehicle based on an output of a GNSS receiver; and if a predetermined condition is satisfied and the identified object is an object indicating a boundary of a low emission zone which requires that the internal combustion engine be stopped, judging whether the hybrid vehicle is located within the low emission zone, regardless of the output of the GNSS receiver, based on a result of identification of the object detected by the object detection device.

Advantageous Effects of Invention

According to the present disclosure, it is possible to suppress erroneous recognition of the position of a hybrid vehicle in the vicinity of a low emission zone when the precision of detection by a GNSS receiver drops.

DESCRIPTION OF EMBODIMENTS

Figure 1:
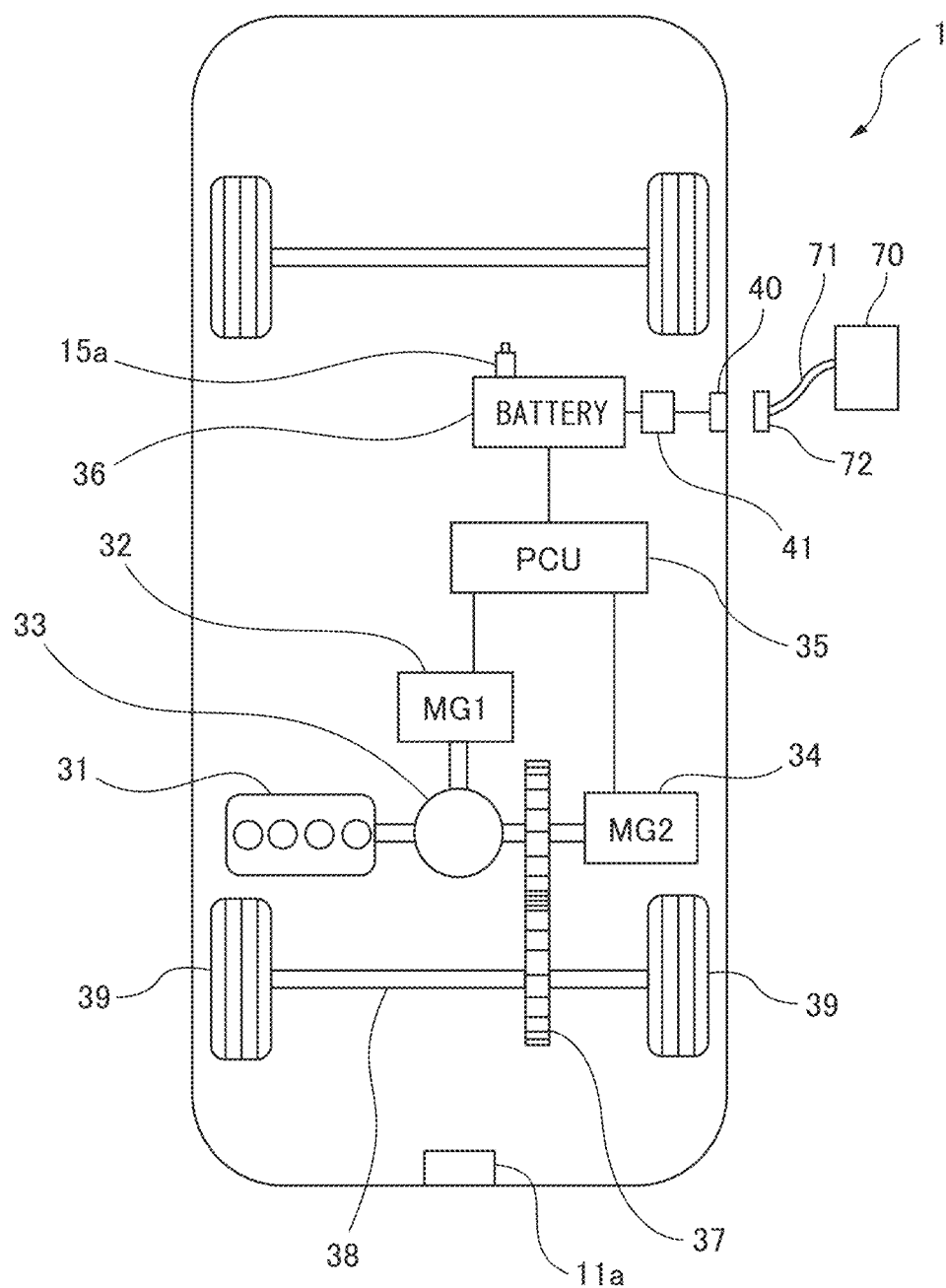
FIG. 1 is a view showing one example of the configuration of a hybrid vehicle in which a home position estimation system according to a first embodiment of the present disclosure is provided.

Below, referring to the drawings, embodiments of the present disclosure will be explained in detail. Note that, in the following explanation, similar component elements will be assigned the same reference notations.

First Embodiment

First, referring to FIG. 1 to FIG. 5, a first embodiment of the present disclosure will be explained.
<Hybrid Vehicle>
FIG. 1 is a view showing one example of the configuration of a hybrid vehicle 1 in which a home position estimation system according to the first embodiment of the present disclosure is provided. The hybrid vehicle 1 is provided with an imaging device 11a, an internal combustion engine 31, a first motor-generator 32, a power splitting mechanism 33, a second motor-generator 34, a power control unit (PCU) 35, a battery 36, and a speed reducer 37.

The imaging device 11a captures the outside the hybrid vehicle 1 to generate an image. For example, the imaging device 11a is arranged at the front of the hybrid vehicle 1 (for example, the back of a rear-view mirror, a front bumper, etc.) so as to capture the area in front of the hybrid vehicle 1.

The internal combustion engine 31 outputs power by burning a mixture of fuel and air inside its cylinders and is, for example, a gasoline engine or a diesel engine. The output shaft (crankshaft) of the internal combustion engine 31 is mechanically connected to the power splitting mechanism 33, and the output of the internal combustion engine 31 is input to the power splitting mechanism 33.

The power splitting mechanism 33 is configured as a known planetary gear mechanism including a sun gear, a ring gear, a pinion gear, and a planetary carrier. The power splitting mechanism 33 distributes the output of the internal combustion engine 31 between the first motor-generator 32 and the speed reducer 37. The output of the internal combustion engine 31 distributed to the speed reducer 37 is transmitted as power for driving use to wheels 39 through an axle 38. Therefore, the internal combustion engine 31 can output power for driving use.

The first motor-generator 32 functions as a generator and a motor. When the first motor-generator 32 functions as a generator, the output of the internal combustion engine 31 is supplied through the power splitting mechanism 33 to the first motor-generator 32. The first motor-generator 32 uses the output of the internal combustion engine 31 to generate electrical power. The electrical power generated by the first motor-generator 32 is supplied through the PCU 35 to at least one of the second motor-generator 34 and the battery 36.

On the other hand, when the first motor-generator 32 functions as a motor, the electrical power stored in the battery 36 is supplied through the PCU 35 to the first motor-generator 32. The output of the first motor-generator 32 is supplied through the power splitting mechanism 33 to the output shaft of the internal combustion engine 31, and the internal combustion engine 31 is cranked.

The second motor-generator 34 functions as a motor and a generator. When the second motor-generator 34 functions as a motor, at least one of the electrical power generated by the first motor-generator 32 and the electrical power stored in the battery 36 is supplied to the second motor-generator 34. The output of the second motor-generator 34 is supplied to the speed reducer 37, and the output of the second motor-generator 34 supplied to the speed reducer 37 is transmitted as power for driving use to the wheels 39 through the axle 38. Therefore, the second motor-generator 34 can output power for driving use. The second motor-generator 34 is one example of an electric motor.

On the other hand, when the hybrid vehicle 1 is decelerating, the second motor-generator 34 is driven by the rotation of the wheels 39, and the second motor-generator 34 functions as a generator. At this time, so-called regeneration is performed, and the regenerated electrical power generated by the second motor-generator 34 is supplied through the PCU 35 to the battery 36.

The PCU 35 has an inverter, a step-up converter, and a DC-DC converter and is electrically connected to the first motor-generator 32, the second motor-generator 34, and the battery 36. The PCU 35 converts DC electrical power supplied from the battery 36 to AC electrical power and converts AC electrical power generated by the first motor-generator 32 or the second motor-generator 34 to DC electrical power.

The battery 36 is supplied with the electrical power generated by the first motor-generator 32 using the output of the internal combustion engine 31 and the regenerated electrical power generated by the second motor-generator 34 using regenerated energy. Therefore, the battery 36 can be charged by the output of the internal combustion engine 31 and the regenerated energy. The battery 36 is a lithium-ion battery, a nickel-hydrogen battery, or other secondary battery.

Figure 2:
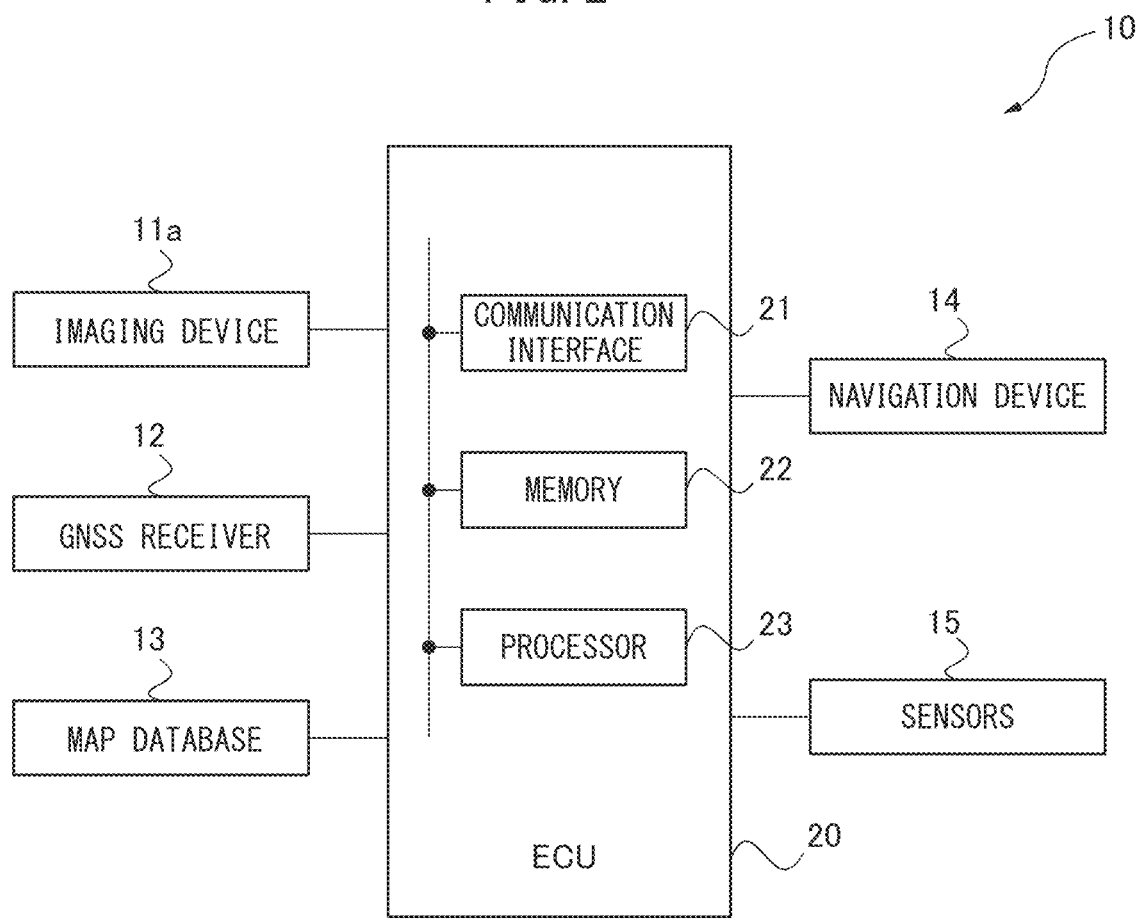
FIG. 2 is a view schematically showing the configuration of the home position estimation system according to the first embodiment of the present disclosure.

Further, the hybrid vehicle 1 is provided with a charging port 40 and a charger 41. The battery 36 can also be charged by an external power source 70. That is, the hybrid vehicle 1 shown in FIG. 2 is a so-called plug-in hybrid vehicle.

The charging port 40 is configured to receive electrical power from the external power source 70 through a charging connector 72 of a charging cable 71. When the battery 36 is charged by the external power source 70, the charging connector 72 is connected to the charging port 40. The charger 41 converts the electrical power supplied from the external power source 70 to electrical power which can be supplied to the battery 36.

Further, an SOC (state of charge) sensor 15a for detecting a state quantity of the battery 36 (voltage, current, etc.) for calculation of the SOC of the battery 36 is provided at the battery 36.

Note that the first motor-generator 32 may be a generator which does not function as a motor. Further, the second motor-generator 34 may be a motor which does not function as a generator. Further, the charging port 40 may be connected to the PCU 35, and the PCU 35 may function as the charger 41.

<Home Position Estimation System>

FIG. 2 is a view schematically showing the configuration of the home position estimation system 10 according to the first embodiment of the present disclosure. The home position estimation system 10 is mounted in the hybrid vehicle 1 and estimates the position (current position) of the hybrid vehicle 1.

As shown in FIG. 2, the home position estimation system 10 is provided with an imaging device 11a, a GNSS receiver 12, a map database 13, a navigation device 14, sensors 15, and an electronic control unit (ECU) 20. The imaging device 11a, the GNSS receiver 12, the map database 13, the navigation device 14, and sensors 15 are provided in the hybrid vehicle 1 and are connected to the ECU 20 to be able to communicate through an internal vehicle network based on the CAN (Controller Area Network) or other standard.

The imaging device 11a detects objects in the surroundings of the hybrid vehicle 1 by capturing the outside the hybrid vehicle 1 and generating an image. The imaging device 11a is one example of an object detection device for detecting objects in the surroundings of the hybrid vehicle 1. The output of the imaging device 11a is transmitted to the ECU 20.

The GNSS receiver 12 captures a plurality of positioning satellites and receives radio waves transmitted from the positioning satellites. The GNSS receiver 12 calculates the distance to the positioning satellites based on the difference between the time of transmission and time of reception of the radio waves and detects the current position of the hybrid vehicle 1 (for example, the longitude and latitude of the hybrid vehicle 1) based on the distances to the positioning satellites and the positions of the positioning satellites (orbit information). The output of the GNSS receiver 12 is transmitted to the ECU 20, and the ECU 20 acquires the current position of the hybrid vehicle 1 from the GNSS receiver 12. Note that GNSS (Global Navigation Satellite System) is an umbrella term for the U.S.' GPS, Russia's GLONASS, Europe's Galileo, Japan's QZSS, China's BeiDou, India's IRNSS, and other satellite positioning systems. That is, the GNSS receiver 12 includes a GPS receiver.

The map database 13 stores map information. The ECU 20 acquires the map information from the map database 13.

The navigation device 14 sets a driving route of the hybrid vehicle 1 to a destination based on the current position of the hybrid vehicle 1 detected by the GNSS receiver 12, the map information from the map database 13, inputs from the driver, etc. The driving route set by the navigation device 14 is transmitted to the ECU 20. Note that the GNSS receiver 12 and map database 13 may be incorporated in the navigation device 14.

The sensors 15 detect state quantities relating to the hybrid vehicle 1 and include a vehicle speed sensor, a gyro sensor, a SOC sensor 15a, etc. The outputs of the sensors 15 are transmitted to the ECU 20, and the ECU 20 acquires the state quantities detected by the sensors 15.

The ECU 20 is provided at the hybrid vehicle 1 and executes various types of control of the hybrid vehicle 1. Note that, in the present embodiment, one ECU 20 is provided, but a plurality of ECUs may be provided for each function.

As shown in FIG. 2, the ECU 20 includes a communication interface 21, a memory 22, and a processor 23. The communication interface 21, a memory 22, and a processor 23 are connected to each other through signal wires.

The communication interface 21 has an interface circuit for connecting the ECU 20 to an internal vehicle network based on the CAN or other standard. The ECU 20 communicates with other vehicle-mounted equipment such as mentioned above through the communication interface 11.

The memory 22 has, for example, a volatile semiconductor memory (for example, a RAM) and a non-volatile semiconductor memory (for example, a ROM). The memory 22 stores programs to be executed by the processor 23, various data to be used when the processor 23 is executing various processes, etc.

The processor 23 has one or more CPUs (central processing units) and peripheral circuits therefor and executes various processing. Note that the processor 23 may further have a processing circuit such as a logic unit or an arithmetic unit.

Figure 3:
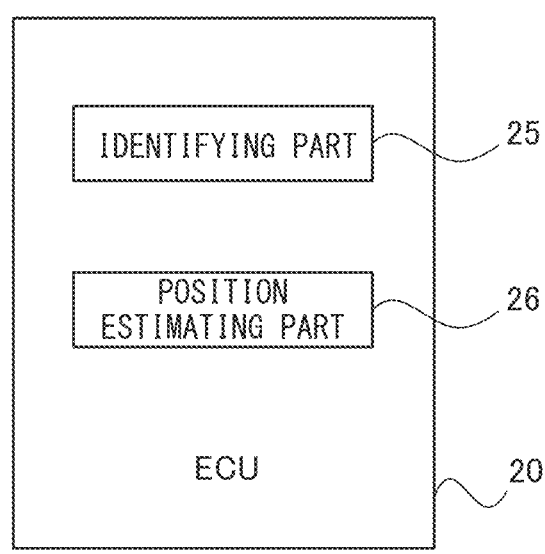
FIG. 3 is a functional block diagram of the ECU in the first embodiment.

FIG. 3 is a functional block diagram of the ECU 20 of the first embodiment. In the present embodiment, the ECU 20 has an identifying part 25 and a position estimating part 26. The identifying part 25 and the position estimating part 26 are functional modules realized by the processor 23 of the ECU 20 running programs stored in the memory 22 of the ECU 20.

The identifying part 25 identifies objects detected by the imaging device 11a. The position estimating part 26 estimates the position of the hybrid vehicle 1 based on the output of the GNSS receiver 12.

In this regard, in order to curb air pollution, low emission zones (LEZ) which require a vehicle to stop its internal combustion engine when driving through them have been established in locations such as urban areas with large amounts of traffic. In such low emission zones, operating internal combustion engines is banned or restricted. In principle, only vehicles that can travel without emitting exhaust gas (for example, hybrid vehicles, electric cars, fuel cell vehicles, etc.) are allowed to pass. If an internal combustion engine is operated in a low emission zone, a fine or the like is imposed on the driver of the vehicle.

Therefore, when a hybrid vehicle 1 is driving through such a low emission zone, it is necessary to make the internal combustion engine 31 stop. For this reason, as much as possible, the hybrid vehicle 1 makes the internal combustion engine 31 stop and uses only the second motor-generator 34 to output power for driving use when in a low emission zone.

However, depending on the driving environment etc., sometimes the precision of estimation of the position by the GNSS receiver 12 drops. In such cases, erroneous position recognition is liable to cause the internal combustion engine 31 to be operated despite the position of the hybrid vehicle 1 being in a low emission zone.

Figure 4:
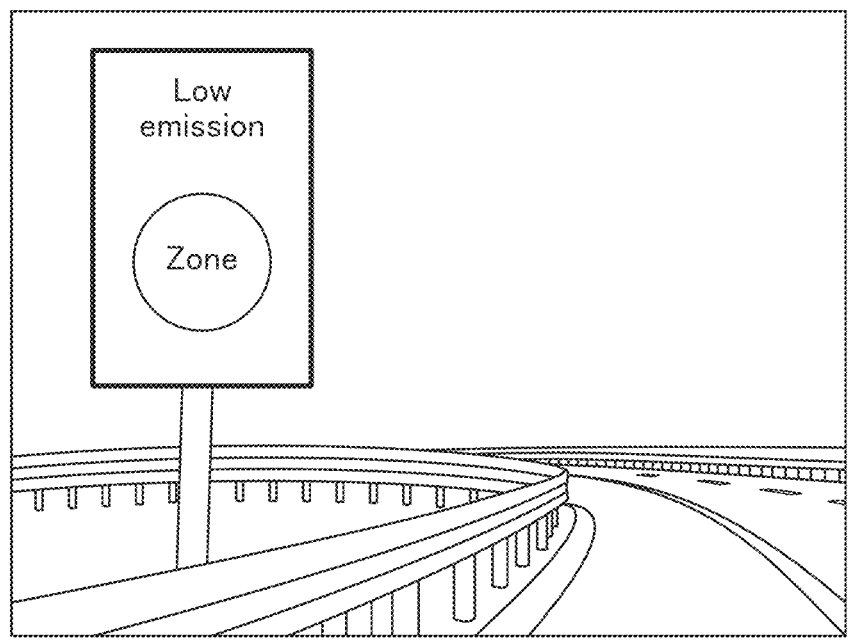
FIG. 4 is a view showing one example of a sign indicating the boundary of a low emission zone.

For this reason, it is desirable to be able to grasp the position of the hybrid vehicle 1 by means other than the GNSS receiver 12 in the vicinity of a low emission zone. In this regard, the boundary of a low-emission zone (also called a "geofence") is provided with a sign indicating the boundary of the low emission zone to make drivers aware of the range of the low emission zone. The sign can be a sign board, a sign post, an electronic sign, etc., indicating the boundary of the low emission zone by text, symbols, graphics, or a combination thereof. One example of such a sign is shown in FIG. 4.

Therefore, in the vicinity of a low emission zone, it is possible to judge whether the hybrid vehicle 1 is located within the low emission zone using a sign indicating the boundary of the low emission zone as an indicator. However, the result of detection of a sign by the imaging device 11a is not necessarily always correct.

For this reason, in the present embodiment, if a predetermined condition is satisfied and an object identified by the identifying part 25 is a sign indicating a boundary of a low emission zone, the position estimating part 26 judges whether the hybrid vehicle 1 is located within a low emission zone, regardless of the output of the GNSS receiver 12, based on the result of identification by the identifying part 25. By doing so, it is possible to suppress erroneous recognition of the position of the hybrid vehicle 1 in the vicinity of a low emission zone when the precision of detection by the GNSS receiver 12 drops.

A sign indicating a boundary of a low emission zone shows entrance to or exit from the low emission zone. For this reason, the position estimating part 26 judges that the hybrid vehicle 1 is located within a low emission zone, regardless of the output of the GNSS receiver 12, if a predetermined condition is satisfied and the object identified by the identifying part 25 is a sign indicating entrance to a low emission zone. On the other hand, the position estimating part 26 judges that the hybrid vehicle 1 is not located within a low emission zone, regardless of the output of the GNSS receiver 12, if a predetermined condition is satisfied and the object identified by the identifying part 25 is a sign indicating exit from a low emission zone.

<Processing for Estimating Home Position>

Figure 5:
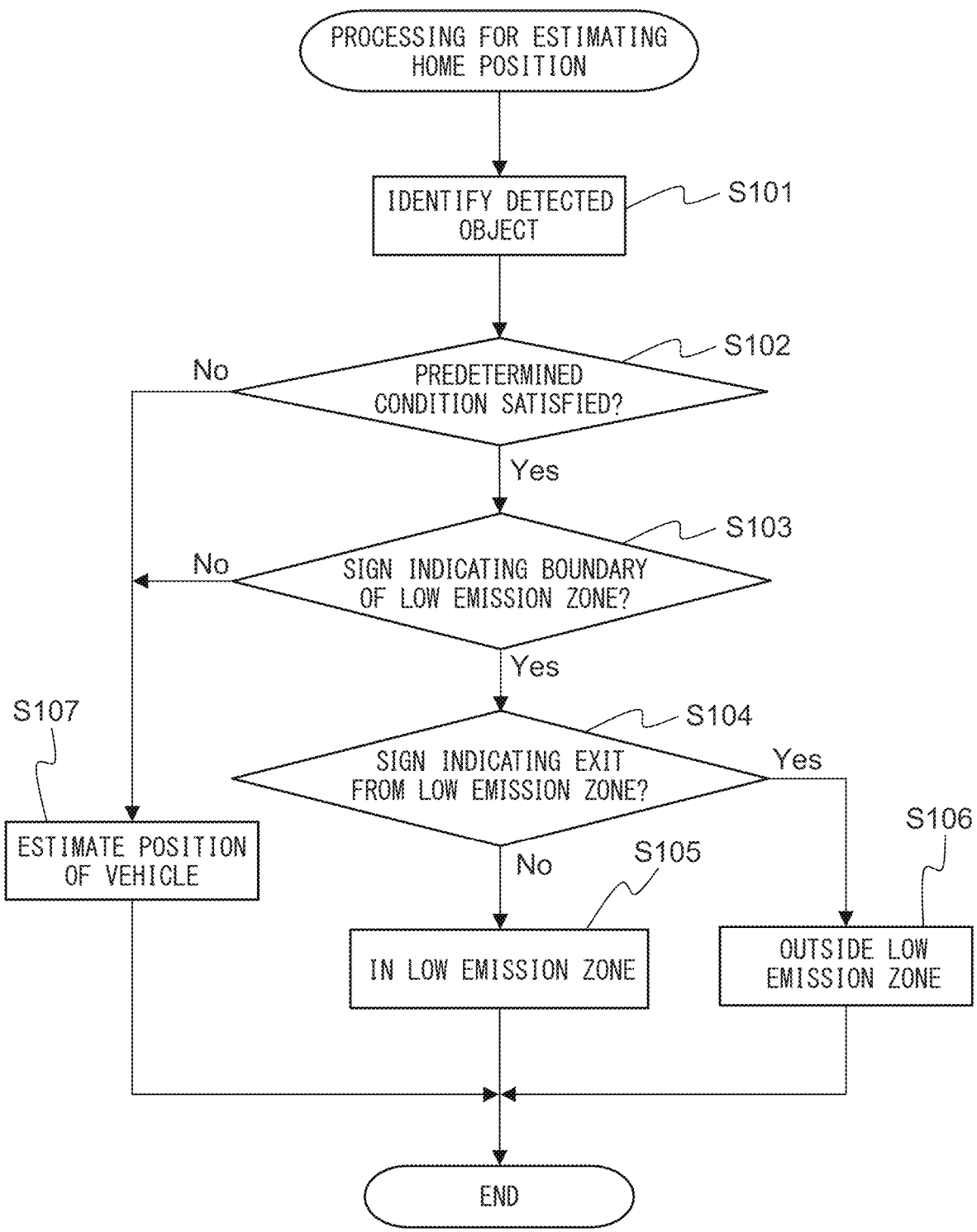
FIG. 5 is a flow chart showing a control routine of processing for estimating a home position in the first embodiment of the present disclosure.

Below, the above-explained control will be explained in detail using the flow chart of FIG. 5. FIG. 5 is a flow chart showing a control routine for processing for estimating a home position in the first embodiment of the present disclosure. The present control routine is repeatedly executed by the ECU 20 at predetermined execution intervals.

First, at step S101, the identifying part 25 identifies an object detected by the imaging device 11a. For example, the identifying part 25 uses a trained neural network model to identify the object detected by the imaging device 11a. In such a case, the neural network model employs a structure such as that of a CNN (Convolutional Neural Network), Faster R-CNN, SSD (Single Shot Multibox Detector), YOLO (You Only Look Once), etc. When image data for an image generated by the imaging device 11a is input into the trained neural network model, the trained neural network model outputs a result of identification and confidence of the result of identification.

Next, at step S102, the position estimating part 26 judges whether a predetermined condition is satisfied. For example, the predetermined condition includes that the confidence output by the trained neural network model is equal to or greater than a predetermined value. That is, the position estimating part 26 judges that the predetermined condition is satisfied if the confidence output by the trained neural network model is equal to or greater than the predetermined value. The predetermined value is set to, for example, 0.7 to 0.9 if the confidence is expressed as a numerical value of 0 to 1.

Note that in addition to or in place of the above-explained condition, the predetermined condition may include that the hybrid vehicle 1 is located in the vicinity of a low emission zone. For example, the position estimating part 26 judges that the hybrid vehicle 1 is located in the vicinity of a low emission zone if the shortest distance between the position of the hybrid vehicle 1 estimated based on the output of the GNSS receiver 12 and the low emission zone (for example, the center position of the low emission zone) within a predetermined time up to the present is equal to or less than a predetermined distance. Note that the position estimating part 26 may judge that the hybrid vehicle 1 is located in the vicinity of a low emission zone if the distance between at least one point on a driving route set by the navigation device 14 and the low emission zone (for example, the center position of the low emission zone) is equal to or less than a predetermined distance. Further, the position estimating part 26 may judge whether the hybrid vehicle 1 is located in the vicinity of a low emission zone based on externally received information such as information from a VICS® (vehicle information and communication system).

If it is judged at step S102 that the predetermined condition is satisfied, the present control routine proceeds to step S103. At step S103, the position estimating part 26 judges whether the object identified by the identifying part 25, that is, the result of identification from the identifying part 25, is a sign indicating a boundary of a low emission zone. If it is judged that the object identified by the identifying part 25 is a sign indicating a boundary of a low emission zone, the present control routine proceeds to step S104.

At step S104, the position estimating part 26 judges whether the sign indicating a boundary of a low emission zone is a sign indicating exit from a low emission zone. For example, the position estimating part 26 judges whether the sign indicating a boundary of a low emission zone is a sign indicating exit from a low emission zone based on history data of the position of the hybrid vehicle 1, the driving route set by the navigation device 14, etc. Specifically, the position estimating part 26 judges that the sign indicating a boundary of a low emission zone is a sign indicating exit from a low emission zone if the current position of the hybrid vehicle 1 estimated based on the above information is within the low emission zone.

Further, sometimes a sign indicating a boundary of a low emission zone may itself be provided with an indicator indicating entrance to or exit from a low emission zone. For this reason, images of signs indicating entrance to low emission zones and images of signs indicating exit from low emission zones may be employed as teacher data for training the neural network model, and the trained neural network model may output a sign indicating entrance to a low emission zone and a sign indicating exit from a low emission zone as separate results of identification. In such a case, the position estimating part 26 judges whether the sign indicating a boundary of a low emission zone is a sign indicating exit from a low emission zone based on the result of identification output from the trained neural network model.

If it is judged at step S104 that the sign indicating a boundary of a low emission zone is a sign indicating entrance to a low emission zone, the present control routine proceeds to step S105. At step S105, the position estimating part 26 judges that the hybrid vehicle 1 is located within a low emission zone. In such a case, the internal combustion engine 31 of the hybrid vehicle 1 is stopped and only the second motor-generator 34 is used to output power for driving use. After step S105, the present control routine ends.

On the other hand, if it is judged at step S104 that the sign indicating a low emission zone boundary is a sign indicating exit from a low emission zone, the present control routine proceeds to step S106. At step S106, the position estimating part 26 judges that the hybrid vehicle 1 is not located within the low emission zone. In other words, the position estimating part 26 judges that the hybrid vehicle 1 is located outside the low emission zone. In such a case, for example, operation of the internal combustion engine 31 of the hybrid vehicle 1 is permitted after a predetermined time and the internal combustion engine 31 is operated in accordance with the vehicle state of the hybrid vehicle 1 (demanded output, SOC of the battery 36, etc.). After step S106, the present control routine ends.

Further, if it is judged at step S102 that the predetermined condition is not satisfied or if it is judged at step S103 that the object identified by the identifying part 25 is not a sign indicating a boundary of a low emission zone, the present control routine proceeds to step S107. At step S107, the position estimating part 26 estimates the position (current position) of the hybrid vehicle 1 based on the output of the GNSS receiver 12.

For example, the position estimating part 26 uses the map information of the map database 13, the output of the GNSS receiver 12, and a known autonomous navigation technique (dead reckoning) to estimate the position of the hybrid vehicle 1. Specifically, the position estimating part 26 specifies a reference point (base point) on a map based on the map information of the map database 13 and the output of the GNSS receiver 12 and calculates the distance of travel and the direction of travel of the hybrid vehicle 1 with respect to the reference point based on the outputs of sensors 15 such as the vehicle speed sensor and the gyro sensor to estimate the position of the hybrid vehicle 1. Position information of low emission zones is stored in the map information of the map database 13. The position estimating part 26 compares the estimated position of the hybrid vehicle 1 with low emission zone ranges to judge whether the hybrid vehicle 1 is located within a low emission zone. After step S107, the present control routine ends.

Note that a sign indicating a boundary of a low emission zone is often placed only at the entrance to a low emission zone (for example, the side of a road heading toward a low emission zone). For this reason, steps S104 and S106 may be omitted. That is, the position estimating part 26 may judge that the hybrid vehicle 1 is located within a low emission zone, regardless of the output of the GNSS receiver 12, if the predetermined condition is satisfied and the object identified by the identifying part 25 is a sign indicating a boundary of a low emission zone.

Further, the identifying part 25 may identify an object detected by the imaging device 11a using pattern matching, SURF (Speeded-Up Robust Features), or another image recognition technique not based on a neural network. In such a case, the predetermined condition in step S102 includes, for example, the current driving environment of the hybrid vehicle 1 not being a predetermined driving environment in which the precision of detection by the imaging device 11a worsens. The predetermined travel environment includes, for example, thick fog, heavy rain, nighttime, etc., and is detected by sensors 15 such as a rain sensor, a light sensor, etc.

Second Embodiment

The configuration and control of a home position estimation system according to a second embodiment are basically similar to the configuration and control of the home position estimation system according to the first embodiment with the exception of the points explained below. For this reason, below, the parts of the second embodiment of the present disclosure different from the first embodiment will be focused on in the explanation.

Figure 6:
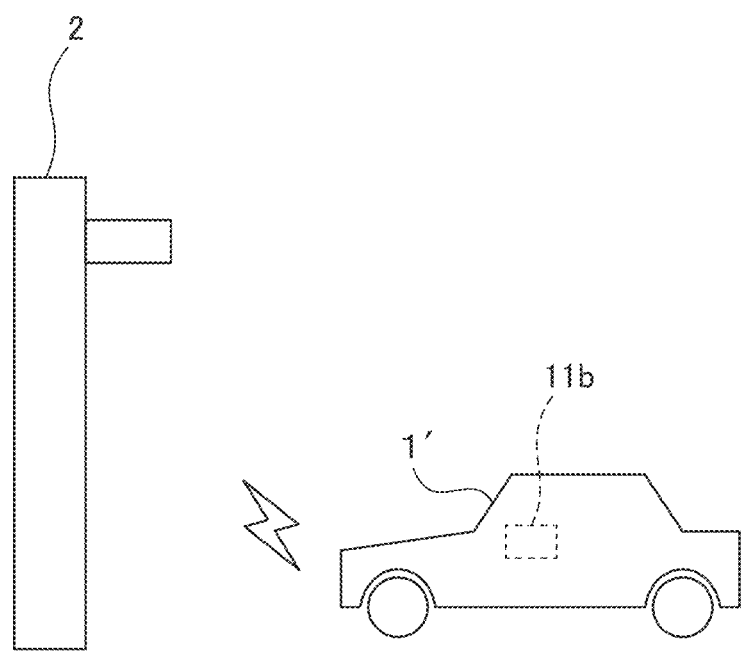
FIG. 6 is a view schematically showing the configuration of a hybrid vehicle in which a home position estimation system according to a second embodiment of the present disclosure is provided.

FIG. 6 is a view schematically showing the configuration of a hybrid vehicle 1' in which the home position estimation system according to the second embodiment of the present disclosure is provided. In the second embodiment, the hybrid vehicle 1' is provided with a road-to-vehicle communication device 11b. The road-to-vehicle communication device 11b is a device which enables communication between the hybrid vehicle 1' and a road-side device 2.

Figure 7:
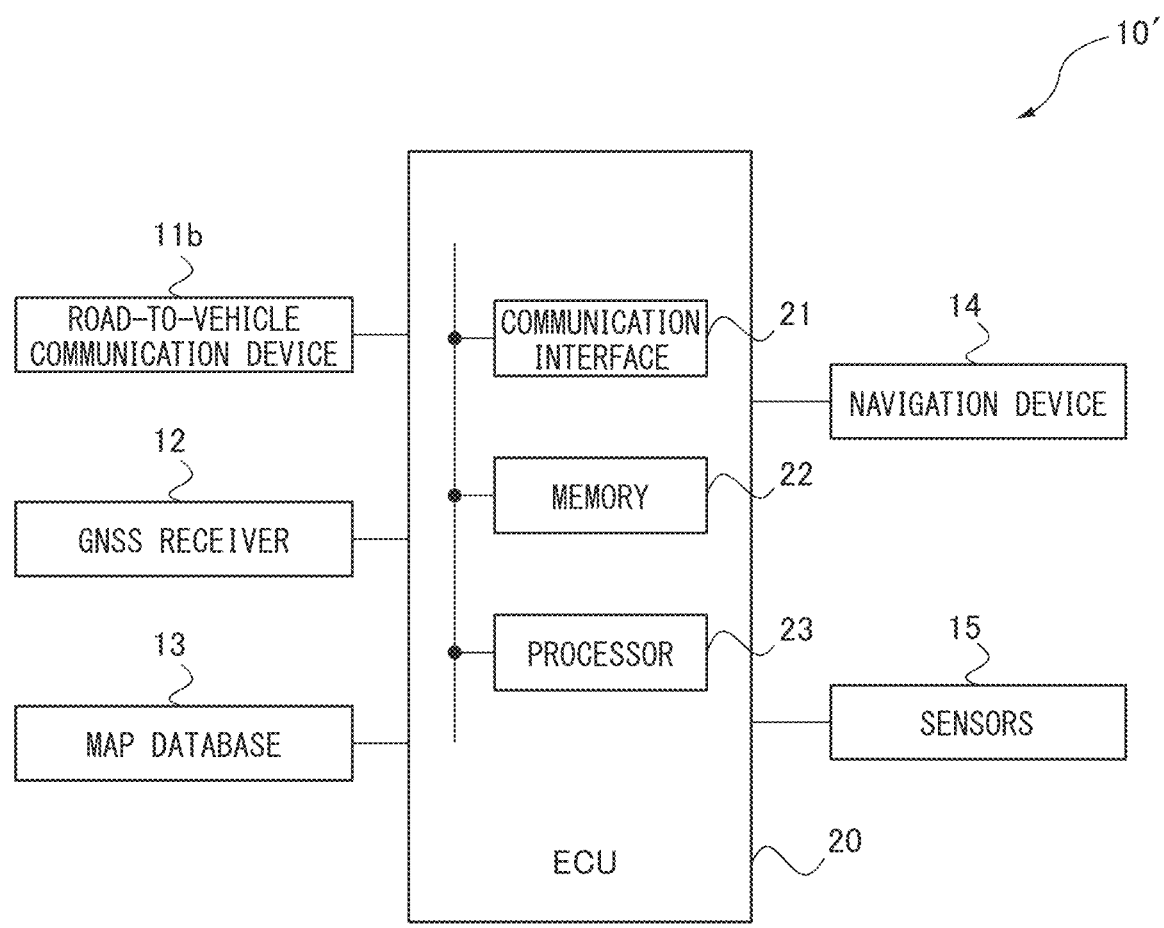
FIG. 7 is a view schematically showing the configuration of the home position estimation system according to the second embodiment of the present disclosure.

FIG. 7 is a view schematically showing the configuration of the home position estimation system 10' according to the second embodiment of the present disclosure. The home position estimation system 10' comprises a road-to-vehicle communication device 11b, a GNSS receiver 12, a map database 13, a navigation device 14, sensors 15, and an ECU 20. The road-to-vehicle communication device 11b, the GNSS receiver 12, the map database 13, the navigation device 14, and the sensors 15 are provided in the hybrid vehicle 1' and are connected to the ECU 20 to be able to communicate through an internal vehicle network based on the CAN or other standard.

Therefore, in the second embodiment, the home position estimation system 10' is provided with the road-to-vehicle communication device 11b in place of the imaging device 11a. The road-to-vehicle communication device 11b receives radio waves from road-side devices 2 to detect the road-side devices in the surroundings of the hybrid vehicle 1'. The road-to-vehicle communication device 11b is one example of an object detection device for detecting objects in the surroundings of the hybrid vehicle 1'. The information contained in radio waves received by the road-to-vehicle communication device 11b is transmitted to the ECU 20. Note that the road-to-vehicle communication device 11b may be assembled into the navigation device 14.

Meanwhile, in addition to or in place of signs indicating boundaries of low emission zone, road-side devices such as ETC (Electronic Toll Collection System) 2.0 road-side devices are sometimes provided at the boundaries of low emission zones to make drivers be aware of the range of low emission zones. In such a case, it is possible to judge whether the hybrid vehicle 1' is located within a low emission zone by detecting such road-side devices.

For this reason, in the second embodiment, if a predetermined condition is satisfied and the object identified by the identifying part 25 is a road-side device indicating a boundary of a low emission zone, the position estimating part 26 judges whether the hybrid vehicle 1 is located within a low emission zone, regardless of the output of the GNSS receiver 12, based on the result of identification by the identifying part 25. By doing so, it is possible to suppress erroneous recognition of the position of the hybrid vehicle 1' in the vicinity of a low emission zone when the precision of detection by the GNSS receiver 12 drops.

A road-side device indicating a boundary of a low emission zone indicates an entrance to or exit from a low emission zone. For this reason, the position estimating part 26 judges that the hybrid vehicle 1' is located within a low emission zone, regardless of the output of the GNSS receiver 12, if the predetermined condition is satisfied and the object identified by the identifying part 25 is a road-side device indicating an entrance to a low emission zone. On the other hand, the position estimating part 26 judges that the hybrid vehicle 1' is not located within a low emission zone, regardless of the output of the GNSS receiver 12, if the predetermined condition is satisfied and the object identified by the identifying part 25 is a road-side device indicating exit from a low emission zone.

<Processing for Estimating Home Position>

Figure 8:
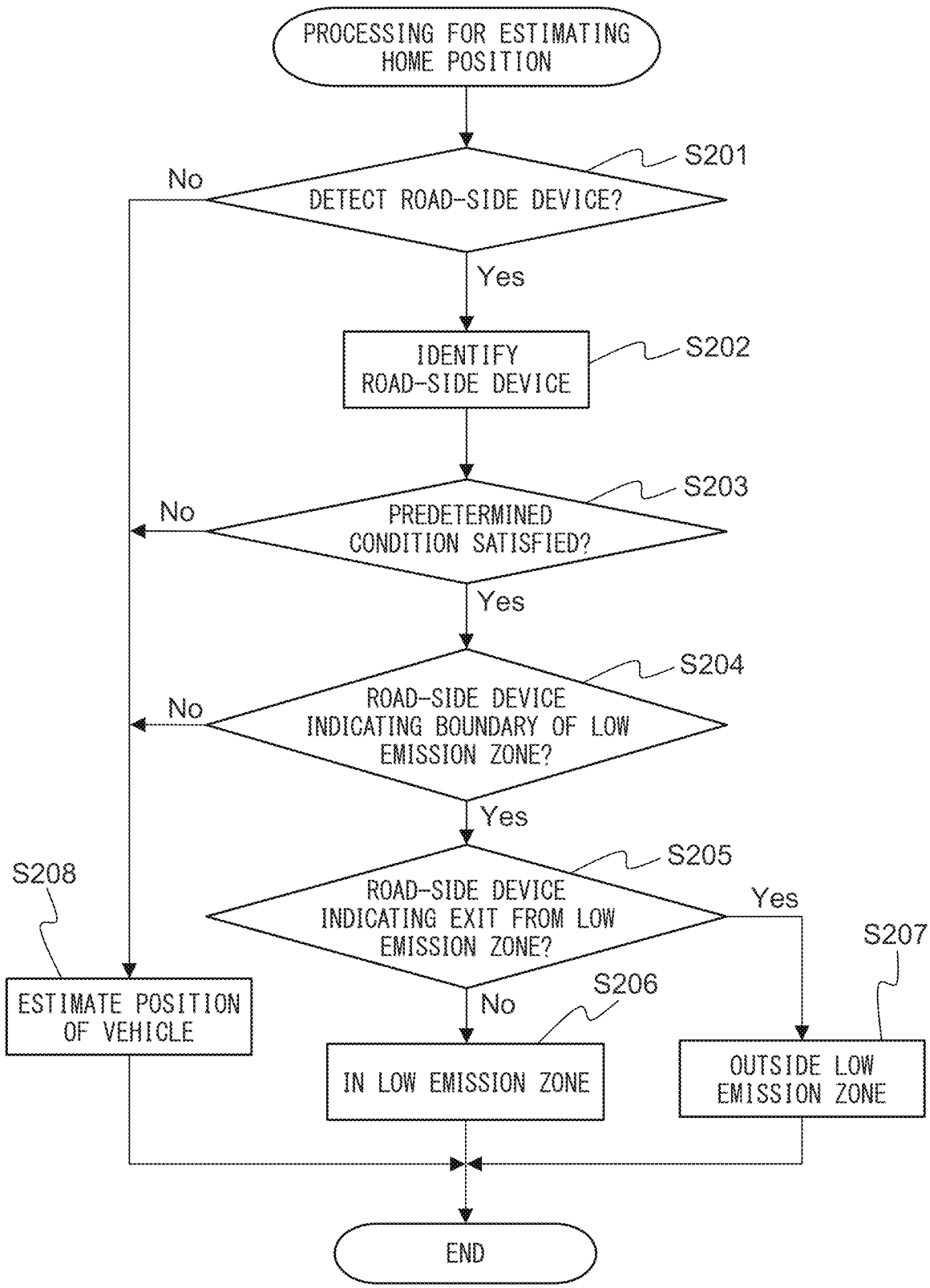
FIG. 8 is a flow chart showing a control routine of processing for estimating a home position in the second embodiment of the present disclosure.

FIG. 8 is a flow chart showing a control routine for processing for estimating a home position in the second embodiment of the present disclosure. The present control routine is repeatedly executed by the ECU 20 at predetermined execution intervals.

First, at step S201, the identifying part 25 judges whether a road-side device is detected by the road-to-vehicle communication device 11b. Specifically, the identifying part 25 judges whether the road-to-vehicle communication device 11b has received radio waves from a road-side device. When it is judged that a road-side device is detected by the road-to-vehicle communication device 11b, the present control routine proceeds to step S202.

At step S202, the identifying part 25 identifies the road-side device detected by the road-to-vehicle communication device 11b. Specifically, the identifying part 25 identifies the road-side device based on the information contained in the radio waves transmitted from the road-side device to the road-to-vehicle communication device 11b.

Next, at step S203, the position estimating part 26 judges whether a predetermined condition is satisfied. For example, the predetermined condition includes the hybrid vehicle 1' being located in the vicinity of a low emission zone. For example, the position estimating part 26 judges that the hybrid vehicle 1' is located in the vicinity of a low emission zone if the shortest distance between the position of the hybrid vehicle 1' estimated based on the output of the GNSS receiver 12 and the low emission zone (for example, the center position of the low emission zone) within a predetermined time up to the present is equal to or less than a predetermined distance. Note that the position estimating part 26 may judge that the hybrid vehicle 1' is located in the vicinity of a low emission zone if the distance between at least one point on a driving route set by the navigation device 14 and the low emission zone (for example, the center position of the low emission zone) is equal to or less than a predetermined distance. Further, the position estimating part 26 may judge whether the position of the hybrid vehicle 1 is located in the vicinity of a low emission zone based on externally received information such as information from a VICS®.

If it is judged at step S203 that the predetermined condition is satisfied, the present control routine proceeds to step S204. At step S204, the position estimating part 26 judges whether the object identified by the identifying part 25, that is, the road-side device identified by the identifying part 25, is a road-side device indicating a boundary of a low emission zone. If it is judged that the object identified by the identifying part 25 is a road-side device indicating a boundary of a low emission zone, the present control routine proceeds to step S205.

At step S205, the position estimating part 26 judges whether the road-side device indicating a boundary of a low emission zone is a road-side device indicating exit from a low emission zone based on the information contained in the radio waves transmitted from the road-side device to the road-to-vehicle communication device 11b. Note that if information for performing the above judgment is not contained in the radio waves, the position estimating part 26, for example, judges whether the road-side device indicating a boundary of a low emission zone is a road-side device indicating exit from a low emission zone based on the history data of the position of the hybrid vehicle 1', the driving route set by the navigation device 14, etc. Specifically, the position estimating part 26 judges that the road-side device indicating a boundary of a low emission zone is a road-side device indicating exit from a low emission zone if the current position of the hybrid vehicle 1' estimated based on the above information is within a low emission zone.

If it is judged at step S205 that the road-side device indicating a boundary of a low emission zone is a road-side device indicating an entrance to a low emission zone, the present control routine proceeds to step S206. At step S206, the position estimating part 26 judges that the hybrid vehicle 1' is located within a low emission zone. In such a case, the internal combustion engine 31 of the hybrid vehicle 1' is stopped and only the second motor-generator 34 is used to output power for driving use. After step S206, the present control routine ends.

On the other hand, if it is judged at step S205 that the road-side device indicating a boundary of a low emission zone is a road-side device indicating exit from a low emission zone, the present control routine proceeds to step S207. At step S207, the position estimating part 26 judges that the hybrid vehicle 1' is not located within a low emission zone. In other words, the position estimating part 26 judges that the hybrid vehicle 1' is outside the low emission zone. In such a case, for example, operation of the internal combustion engine 31 of the hybrid vehicle 1' is permitted after a predetermined time and the internal combustion engine 31 is operated in accordance with the vehicle state of the hybrid vehicle 1' (demanded output, SOC of the battery 36, etc.). After step S207, the present control routine ends.

Further, if it is judged at step S201 that a road-side device is not detected by the road-to-vehicle communication device 11b, if it is judged at step S203 that the predetermined condition is not satisfied, or if it is judged at step S204 that the object identified by the identifying part 25 is not a road-side device indicating a boundary of a low emission zone, the present control routine proceeds to step S208. At step S208, in the same way as step S107 of FIG. 5, the position estimating part 26 estimates the position (current position) of the hybrid vehicle 1' based on the output of the GNSS receiver 12. After step S208, the present control routine ends.

Note that usually a road-side device indicating a boundary of a low emission zone is placed only at an entrance to a low emission zone (for example, the side of a road leading to a low emission zone). For this reason, steps S205 and S207 may be omitted. That is, the position estimating part 26 may judge that the hybrid vehicle 1' is located within a low emission zone, regardless of the output of the GNSS receiver 12, if the predetermined condition is satisfied and the object identified by the identifying part 25 is a road-side device indicating a boundary of a low emission zone.

Third Embodiment

The configuration and control of a home position estimation system according to a third embodiment are basically similar to the configuration and control of the home position estimation system according to the first embodiment with the exception of the points explained below. For this reason, below, the parts of the third embodiment of the present disclosure different from the first embodiment will be focused on in the explanation.

Figure 9:
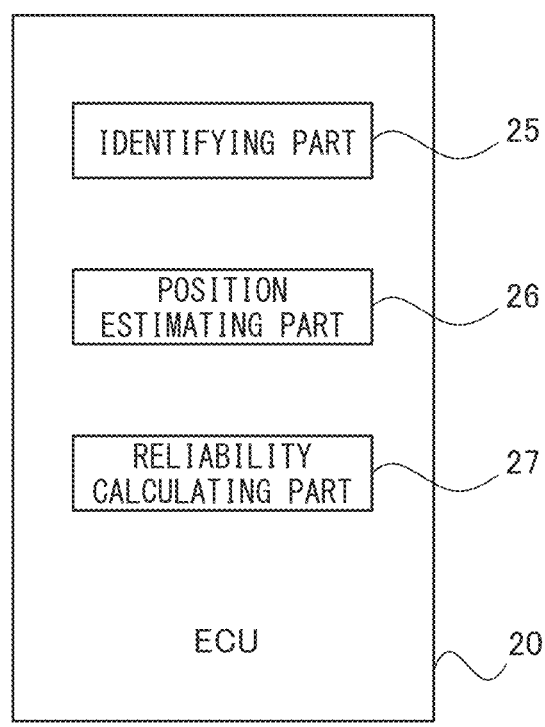
FIG. 9 is a functional block diagram for an ECU in a third embodiment.

FIG. 9 is a functional block diagram for the ECU 20 in the third embodiment. In the third embodiment, the ECU 20 has a reliability calculating part 27 in addition to the identifying part 25 and the position estimating part 26. The reliability calculating part 27 calculates the reliability of the results of the output of the GNSS receiver 12. The identifying part 25, the position estimating part 26, and the reliability calculating part 27 are functional modules realized by the processor 23 of the ECU 20 running programs stored in the memory 22 of the ECU 20.

As explained above, if a predetermined condition is satisfied and the object identified by the identifying part 25 is a sign indicating a boundary of a low emission zone, the position estimating part 26 judges whether the hybrid vehicle 1 is located within a low emission zone, regardless of the output of the GNSS receiver 12, based on the result of identification from the identifying part 25. In the third embodiment, the predetermined condition includes the reliability calculated by the reliability calculating part 27 being equal to or less than a reference value.

<Processing for Estimating Home Position>

Figure 10:
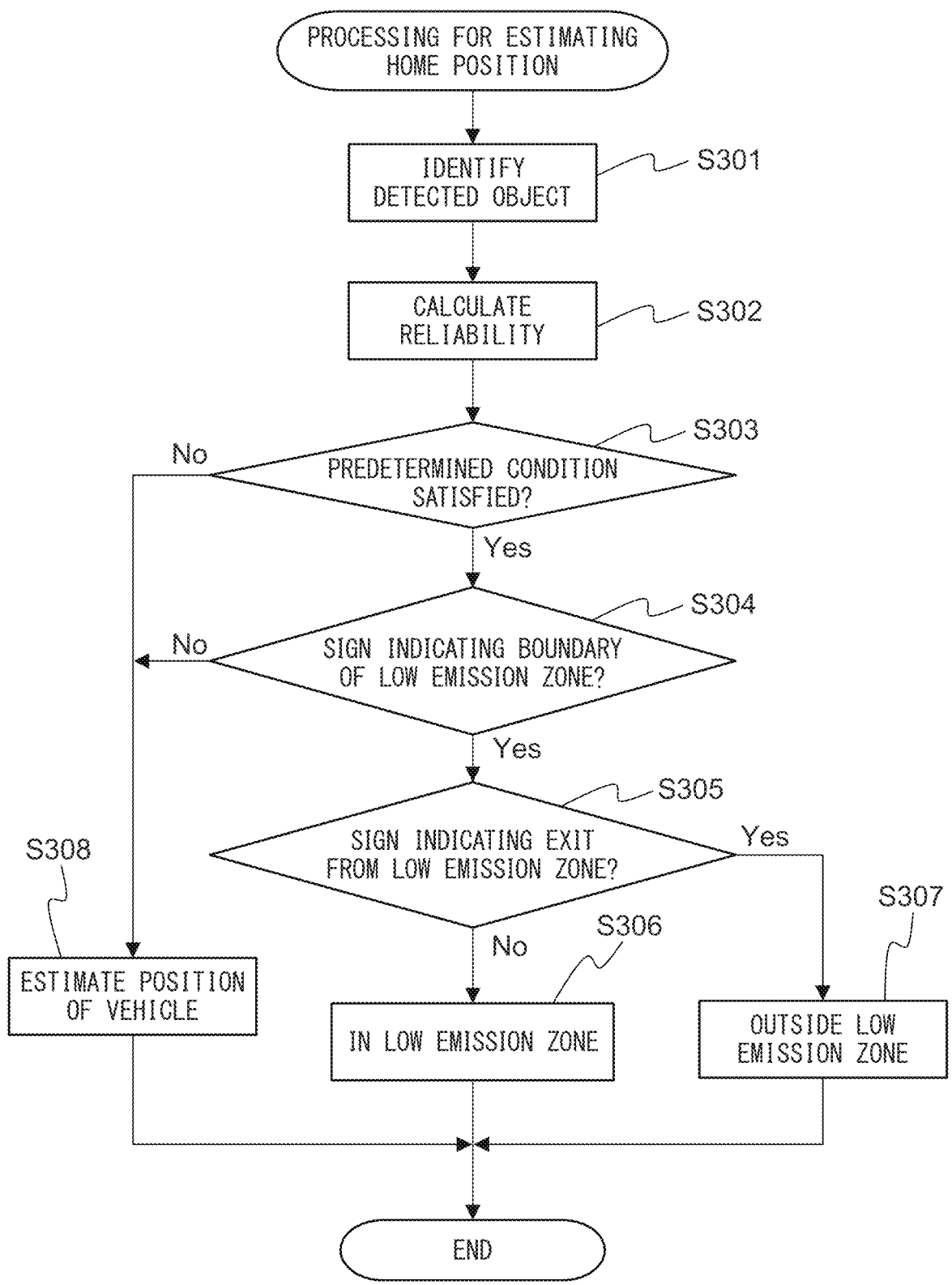
FIG. 10 is a flow chart showing a control routine of processing for estimating a home position in the third embodiment of the present disclosure.

FIG. 10 is a flow chart showing a control routine for processing for estimating a home position in the third embodiment of the present disclosure. The present control routine is repeatedly executed by the ECU 20 at predetermined execution intervals.

First, at step S301, in the same way as step S101 of FIG. 5, the identifying part 25 identifies the object detected by the imaging device 11a.

Next, at step S302, the reliability calculating part 27 calculates the reliability of the output of the GNSS receiver 12 (below, simply referred to as the "reliability"). For example, the reliability calculating part 27 calculates the reliability based on the reception state of the GNSS receiver 12. In such a case, the reliability calculating part 27, for example, calculates the reliability of the position information based on the number of positioning satellites captured by the GNSS receiver 12 and, when the number of positioning satellites captured by the GNSS receiver 12 is equal to or less than a predetermined number (for example, 2 or 3), calculates the reliability as a value equal to or less than a reference value. Further, the reliability calculating part 27 may calculate the reliability based on a DOP (Dilution of Precision) value relating to the GNSS receiver 12 and, when the DOP value is equal to or greater than a predetermined value, calculate the reliability as a value equal to or less than the reference value $T_{ref}$. In such a case, the DOP value can be the value of any one of HDOP (horizontal dilution of precision) and VDOP (vertical dilution of precision) or the average of the HDOP and VDOP values.

Further, in a so-called cold start state where the GNSS receiver 12 is restarted after the orbit information of the positioning satellites is erased due to time elapse or the like, capturing the positioning satellites to receive radio waves will take time. For this reason, when the supply of power to the GNSS receiver 12 stops for equal to or greater than a predetermined time, the reliability calculating part 27 may calculate the reliability as a value equal to or less than the reference value. The predetermined time is set to the time from when the supply of power to the GNSS receiver 12 is stopped to when the orbit information of the positioning satellites is erased. That is, when a cold start of the GNSS receiver 12 is performed, the reliability calculating part 27 may calculate the reliability as a value equal to or less than the reference value.

Further, when the hybrid vehicle 1 is transported by a ferry, an auto-transport trailer, etc., the position of the hybrid vehicle 1 cannot be estimated using the autonomous navigation technique. For this reason, when the hybrid vehicle 1 is transported, the reliability calculating part 27 may calculate the reliability as a value equal to or less than the reference value.

Immediately after the hybrid vehicle 1 has been transported, the general position of the hybrid vehicle 1 can be grasped based on the output of the GNSS receiver 12. For this reason, the hybrid vehicle 1 having been transported may be determined based on, for example, the output of the GNSS receiver 12. When the position of the hybrid vehicle 1 has greatly changed at the time the GNSS receiver 12 is restarted, it is judged that the hybrid vehicle 1 has been transported. Further, the hybrid vehicle 1 having been transported by a ferry may be determined based on the driving route set by the navigation device 14.

Further, when the advancing direction of the hybrid vehicle 1 is changed by a turntable in a location such as a multistory parking lot, the position of the hybrid vehicle 1 estimated by the autonomous navigation technique will deviate from the actual position. For this reason, when the advancing direction of the hybrid vehicle 1 is changed by a turntable, the reliability calculating part 27 may calculate the reliability as a value equal to or less than the reference value. For example, information relating to a parking lot (for example, whether or not a turntable is present) is stored in the map information of the map database 13 and, when the hybrid vehicle 1 has parked in a parking lot with a turntable, it is judged that the advancing direction of the hybrid vehicle 1 has been changed by the turntable.

Further, sometimes a portable terminal (for example, a smartphone, a tablet terminal, a laptop, etc.) brought into the hybrid vehicle 1 by the driver or the like is electrically connected to the hybrid vehicle 1 (specifically, the ECU 20) by a cable or wireless connection. In such cases, when the distance between the position of the hybrid vehicle 1 estimated by the position estimating part 26 and the position of the hybrid vehicle 1 detected by the portable terminal is equal to or greater than a predetermined distance, the reliability calculating part 27 may calculate the reliability of the position information as a value equal to or less than the reference value.

Next, at step S303, the position estimating part 26 judges whether a predetermined condition is satisfied. The predetermined condition includes, in addition to or in place of the above-explained condition relating to the first embodiment, the reliability calculated by the reliability calculating part 27 being equal to or less than the reference value. The reference value is predetermined.

After step S303, step S304 to step S308 are executed in the same way as step S103 to step S107 of FIG. 5. Note that the present control routine can be modified in the same way as the control routine of FIG. 5.

Fourth Embodiment

The configuration and control of a home position estimation system according to a fourth embodiment are basically similar to the configuration and control of the home position estimation system according to the first embodiment with the exception of the points explained below. For this reason, below, the parts of the fourth embodiment of the present disclosure different from the first embodiment will be focused on in the explanation.

Figure 11:
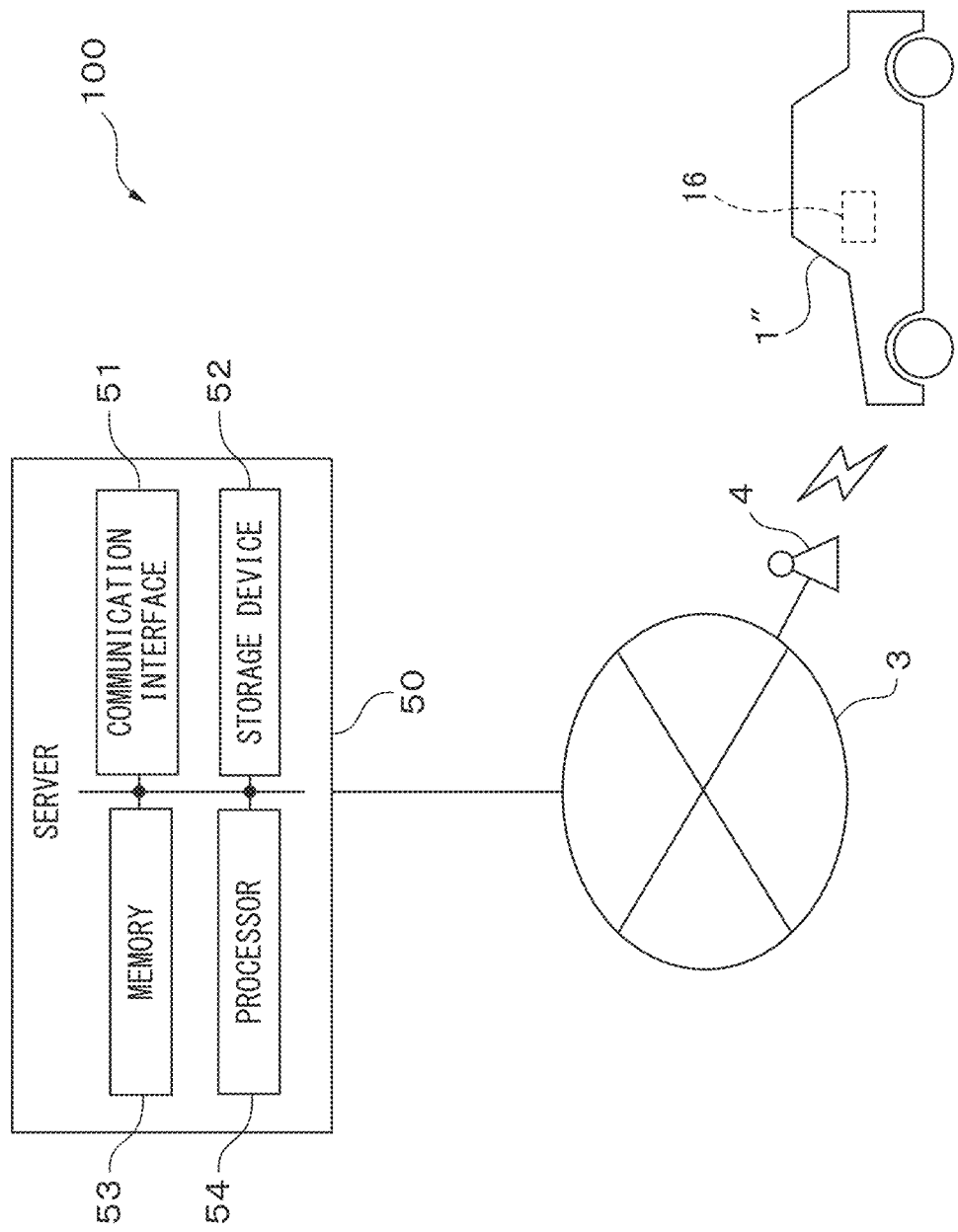
FIG. 11 is a schematic view of the configuration of a client-server system including a hybrid vehicle in which a home position estimation system according to a fourth embodiment of the present disclosure is provided.

FIG. 11 is a schematic view of the configuration of a client-server system 100 including a hybrid vehicle 1" in which the home position estimation system according to the fourth embodiment of the present disclosure is provided. The client-server system 100 comprises the hybrid vehicle 1" and a server 50. The server 50 is capable of communicating with a plurality of vehicles including the hybrid vehicle 1".

As shown in FIG. 5, the server 50 is provided outside the hybrid vehicle 1" and is provided with a communication interface 51, a storage device 52, a memory 53, and a processor 54. Note that the server 50 may further be provided with input devices such as a keyboard and a mouse, output devices such as a display, etc. Further, the server 50 may be constituted by a plurality of computers.

The communication interface 51 is capable of communicating with the hybrid vehicle 1" and enables the server 50 to communicate with the hybrid vehicle 1". Specifically, the communication interface 51 has an interface circuit for connecting the server 50 to a communication network 3. The server 50 communicates with the hybrid vehicle 1" through the communication interface 51, the communication network 3, and a wireless base station 4.

The storage device 52 has, for example, a hard disk drive (HDD), a solid state drive (SSD), an optical recording medium, etc. The storage device 52 stores various data and stores, for example, computer programs by which the processor 54 executes various processing.

The memory 53 has, for example, a semiconductor memory such as a random access memory (RAM). The memory 53 stores, for example, various data to be used when various processing are executed by the processor 54.

The communication interface 51, the storage device 52, and the memory 53 are connected to the processor 54 through signal wires. The processor 54 has one or more CPUs and peripheral circuits therefor and executes various processing. Note that the processor 54 may further have a processing unit such as a logic unit or an arithmetic unit.

In the fourth embodiment, the hybrid vehicle 1" is provided with a communication module 16. The communication module 16 is a device enabling communication between the hybrid vehicle 1" and the outside of the hybrid vehicle 1" (for example, the server 50). The communication module 16 is, for example, a data communication module (DCM) capable of communication with the communication network 3 through the wireless base station 4.

Figure 12:
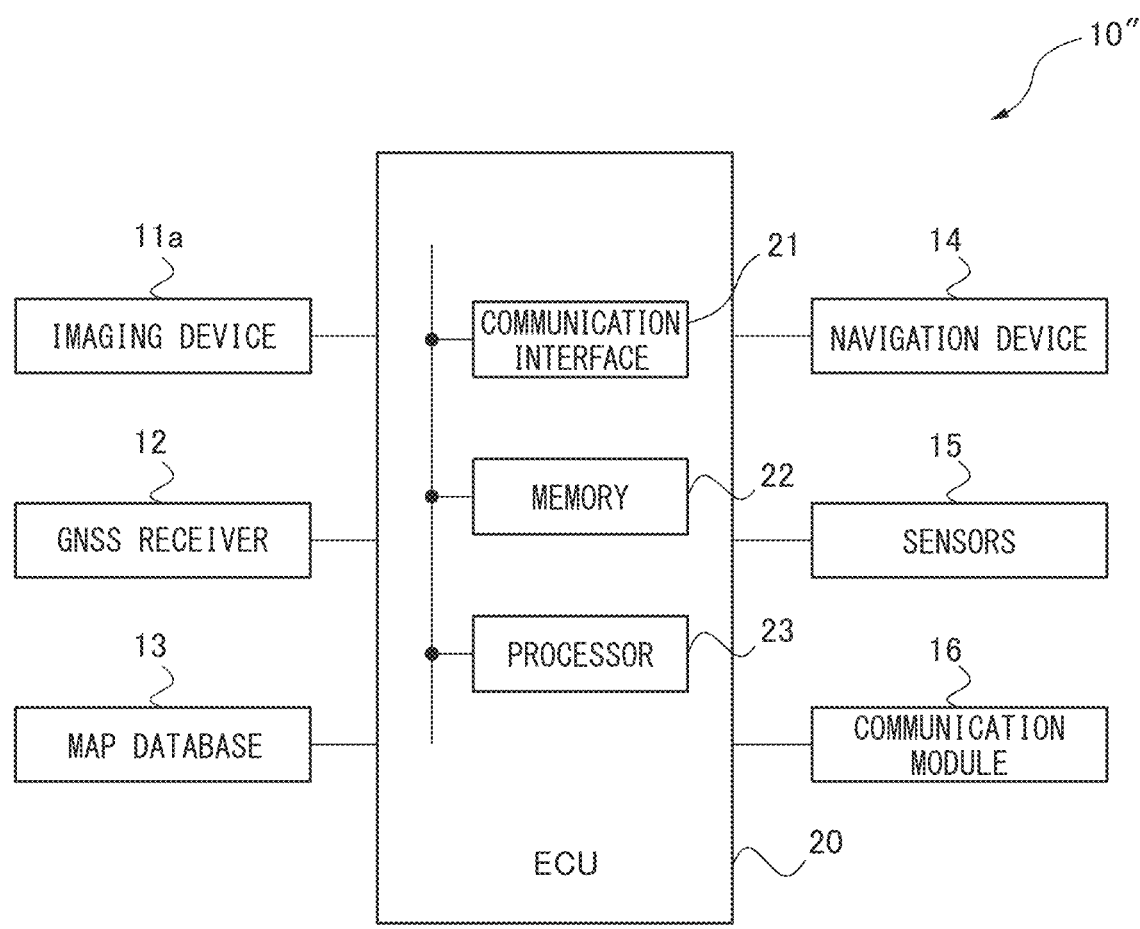
FIG. 12 is a view schematically showing the configuration of the home position estimation system according to the fourth embodiment of the present disclosure.

FIG. 12 is a view schematically showing the configuration of the home position estimation system 10" according to the fourth embodiment of the present disclosure. The home position estimation system 10" comprises an imaging device 11a, a GNSS receiver 12, a map database 13, a navigation device 14, sensors 15, a communication module 16, and an ECU 20. The imaging device 11a, the GNSS receiver 12, the map database 13, the navigation device 14, the sensors 15, and the communication module 16 are provided in the hybrid vehicle 1" and are connected to the ECU 20 to be able to communicate through an internal vehicle network based on the CAN or other standard. Note that the communication module 16 may be assembled into the navigation device 14.

In the fourth embodiment, the position estimating part 26 receives position information of the hybrid vehicle 1" from the server 50. For example, position information for low emission zones is stored in the storage device 52 of the server 50. The server 50 receives the position of the hybrid vehicle 1" from the hybrid vehicle 1" and transmits information regarding whether the position of the hybrid vehicle 1" is within a low emission zone to the hybrid vehicle 1".

As explained above, if a predetermined condition is satisfied and the object identified by the identifying part 25 is a sign indicating a boundary of a low emission zone, the position estimating part 26 judges whether the hybrid vehicle 1" is located within a low emission zone, regardless of the output of the GNSS receiver 12, based on the result of identification from the identifying part 25. In the fourth embodiment, the predetermined condition includes communication between the hybrid vehicle 1" and the server 50 being interrupted.

In the fourth embodiment, in the same way as the first embodiment, the control routine of the home position estimation processing of FIG. 5 is executed. At this time, the predetermined condition of step S102 includes, in addition to or in place of the above-explained condition relating to the first embodiment, the condition that communication between the hybrid vehicle 1" and the server 50 is interrupted.

Above, preferred embodiments according to the present disclosure were explained, but the present disclosure is not limited to these embodiments. Various modifications and changes can be made within the language of the claims.

For example, the portable terminal (for example, a smartphone, a tablet terminal, a laptop, etc.) electrically connected to the hybrid vehicle 1, 1', 1" may have the functions of the GNSS receiver 12, the map database 13, and the navigation device 14.

Further, the charging port 40 and the charger 41 may be omitted from the hybrid vehicle 1, 1', 1". That is, the hybrid vehicle 1, 1', 1" may be a type of hybrid vehicle for which the battery 36 is not charged by an external power source. Further, while the hybrid vehicle 1 shown in FIG. 1 is a so-called series-parallel type of hybrid vehicle, the hybrid vehicle 1, 1', 1" may be a series type, a parallel type, or other type of hybrid vehicle so long as the hybrid vehicle can drive without operating the internal combustion engine.

Further, the embodiments explained above can be carried out in any combination. For example, if the second embodiment and the third embodiment are combined, in the control routine of FIG. 8, step S302 of FIG. 10 is performed between step S202 and step S203. The predetermined condition of step S203 includes the reliability calculated by the reliability calculating part 27 being equal to or less than the reference value.

Further, if the second embodiment and the fourth embodiment are combined, in the control routine of FIG. 8, the predetermined condition of step S203 includes communication between the hybrid vehicle 1" and the server 50 being interrupted. Further, if the third embodiment and the fourth embodiment are combined, in the control routine of FIG. 10, the predetermined condition of step S303 includes the communication between the hybrid vehicle 1" and the server 50 being interrupted.

REFERENCE SIGNS LIST 1, 1', 1". hybrid vehicle
10, 10', 10". home position estimation system
11a. imaging device
11b. road-to-vehicle communication device
12. GNSS receiver
20. electronic control unit (ECU)
25. identifying part
26. position estimating part
31. internal combustion engine
34. second motor-generator
36. battery

The invention claimed is:

1. A home position estimation system for estimating a position of a hybrid vehicle comprising an internal combustion engine, an electric motor, and a battery, the home position estimation system comprising:
a GNSS receiver;
an object detection device for detecting an object in surroundings of the hybrid vehicle; and
a processor configured to
identify the object detected by the object detection device,
estimate a position of the hybrid vehicle based on an output of the GNSS receiver, and
in response to a predetermined condition being satisfied and the identified object being an object indicating a boundary of a low emission zone which requires that the internal combustion engine be stopped, judge whether the hybrid vehicle is located within the low emission zone, regardless of the output of the GNSS receiver, based on a result of identification of the object detected by the object detection device, wherein
the predetermined condition includes
(i) a current driving environment of the hybrid vehicle not being a predetermined driving environment in which a precision of detection by the object detection device worsens, and
(ii) the hybrid vehicle determined to be located in a vicinity of the low emission zone based on the output of the GNSS receiver.

2. The home position estimation system according to claim 1, wherein
the object detection device is an imaging device capturing an outside the hybrid vehicle and generating an image, and
the object indicating the boundary of the low emission zone is a sign.

3. The home position estimation system according to claim 2, wherein
the processor is configured to use a trained neural network model outputting a result of identification and a confidence of the result of identification to identify the object detected by the object detection device, and
the predetermined condition includes the confidence being equal to or greater than a predetermined value.

4. The home position estimation system according to claim 1, wherein
the predetermined driving environment includes fog, rain, and nighttime detected by a sensor.

5. The home position estimation system according to claim 1, wherein
the object detection device is a road-to-vehicle communication device, and
the object indicating the boundary of a low emission zone is a road-side device.

6. A home position estimation method for estimating a position of a hybrid vehicle comprising an internal combustion engine, an electric motor, and a battery, the method including:
detecting an object in surroundings of the hybrid vehicle by an object detection device;
identifying the object detected by the object detection device;
estimating a position of the hybrid vehicle based on an output of a GNSS receiver; and
in response to a predetermined condition being satisfied and the identified object being an object indicating a boundary of a low emission zone which requires that the internal combustion engine be stopped, judging whether the hybrid vehicle is located within the low emission zone, regardless of the output of the GNSS receiver, based on a result of identification of the object detected by the object detection device, wherein
the predetermined condition includes
(i) a current driving environment of the hybrid vehicle not being a predetermined driving environment in which a precision of detection by the object detection device worsens, and
(ii) the hybrid vehicle determined to be located in a vicinity of the low emission zone based on the output of the GNSS receiver.

7. The home position estimation system according to claim 1, wherein
the processor is configured to calculate a reliability of a result of the output of the GNSS receiver, and
the predetermined condition includes the reliability being equal to or less than a reference value.

8. The home position estimation system according to claim 1, wherein
the processor is configured to receive position information of the hybrid vehicle from a server outside the hybrid vehicle, and
the predetermined condition includes communication between the hybrid vehicle and the server being interrupted.

9. The home position estimation method according to claim 6, wherein
the predetermined driving environment includes fog, rain, and nighttime detected by a sensor.

* * * * *